June 2, 1931.  J. R. McWANE  1,808,366
PLANT FOR AND METHOD OF MANUFACTURING CAST IRON PIPE AND THE LIKE
Filed Sept. 20, 1927  2 Sheets-Sheet 1

INVENTOR
James R. McWane
BY
Siggers & Adams,
ATTORNEYS

Patented June 2, 1931

1,808,366

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PLANT FOR AND METHOD OF MANUFACTURING CAST IRON PIPE AND THE LIKE

Application filed September 20, 1927. Serial No. 220,731.

The present invention relates to plants for and methods of manufacturing cast iron pipe and the like.

In the manufacture of cast iron pipe by horizontal, stationary molds, the sand handling and ramming are usually done by manual labor. The workmen make up for a day's work a given number of molds, which, when all are completed, are poured, that is, the molten iron is conveyed in laddles from the cupola to the molds. Subsequently the molds are "shaken out". The castings are removed from the sand, and the sand is wet and subsequently cut or tempered to be ready for the next day's work. Such procedure does not result in a production commensurate with the size of the plant, because only portions of the plant are in productive use at a given time (large areas being necessary for storage), because the gangs of workmen are not continuously busy on one job, and because the production is not continuous.

In recent years, foundry machinery and equipment have been developed which make it possible to automatically accomplish many of the things, in the manufacture of cast iron pipe, which heretofore have been done by hand. The expense of such installations is large and to justify this expense it is necessary to make the operation continuous and highly efficient in order to secure the largest possible tonnage production, in short, to mechanize and synchronize the operations. This program of continuous operation by mechanical means is extremely difficult because of the problem of co-ordinating the different operations, without loss of time and without unnecessary labor or expenditure of power.

The purpose of this invention is to solve these problems by providing a certain arrangement of machinery and equipment and by following a novel method of using the machinery in sequence to the utmost advantage to insure the greatest possible production. The plant is so designed, arranged and used as to be particularly well fitted for two or three shifts in each 24 hour period, because each shift can take up the work where the previous shift has left off, without loss of time or efficiency or extra work arising from the change in shifts.

Figure 1:
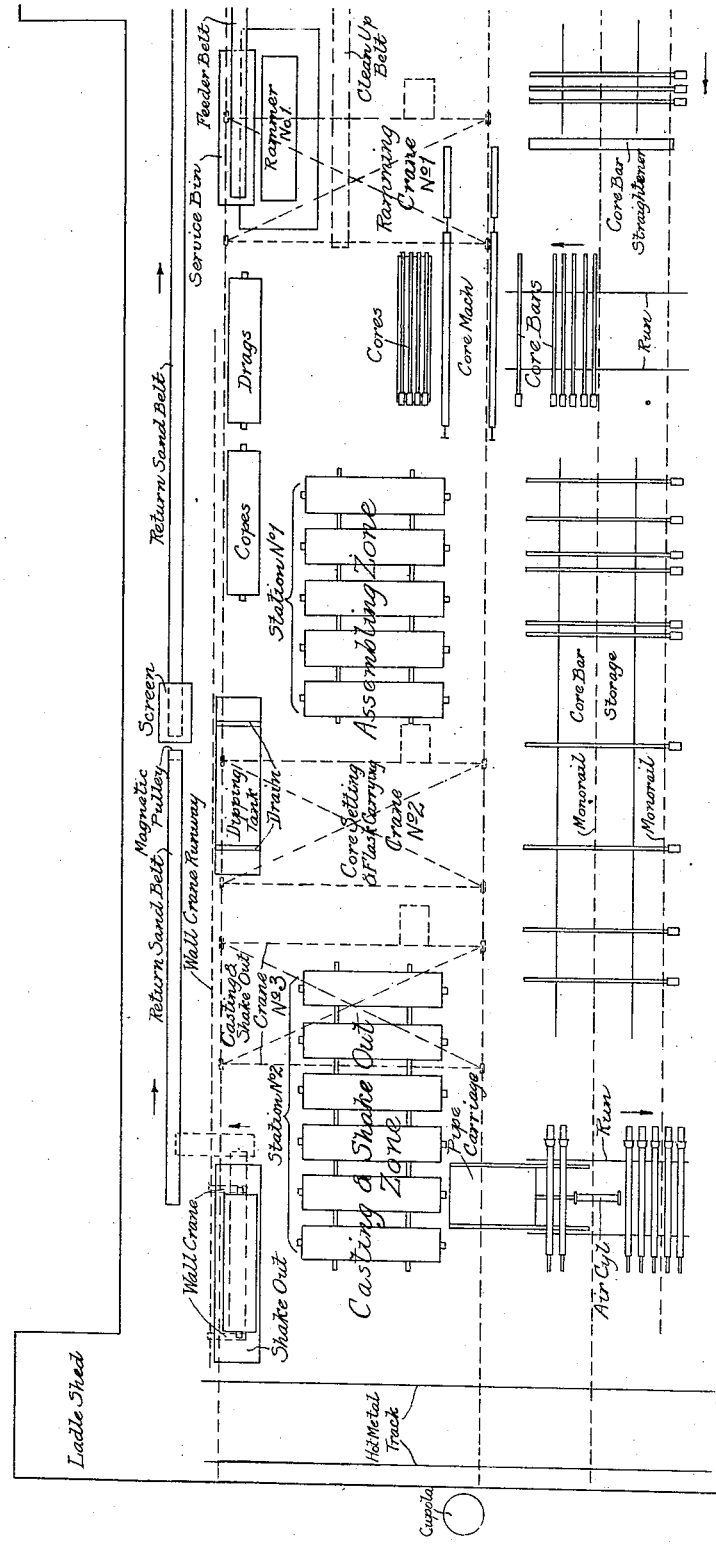
Figure 1A:
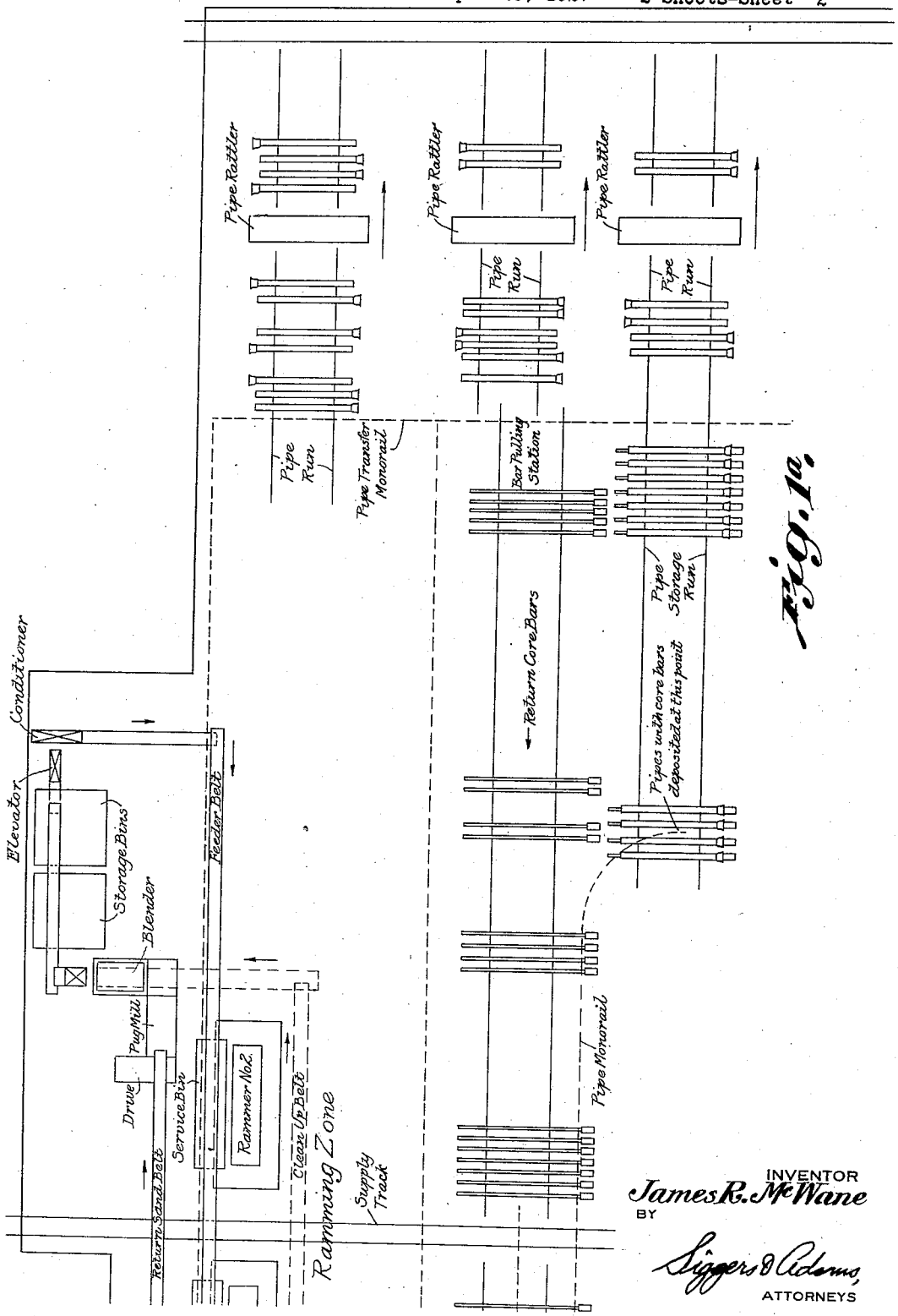

The accompanying drawings of two sheets comprise two figures, Figs. 1 and 1ª, together illustrating diagrammatically a plan view or layout of a plant embodying the invention and useful for carrying out the inventive process.

Referring particularly to the drawings, the sheets of which should be held so that Fig. 1, showing the cupola at the bottom, is to the left of Fig. 1ª, there is shown a portion of a plant for the manufacture of cast iron pipe and the like, the apparatus illustrated being arranged for the continuous production of pipe of a given size. The same kinds of apparatus and the same general arrangement thereof will be employed in the manufacture of the various sizes of pipe, but it will be understood that certain of the equipment including the copes and drags of the flasks, the patterns, the core bars and the core knives of the core making machines, etc., will all be removed, and the corresponding parts for the manufacture of larger or smaller pipes, as desired, will be substituted therefor.

There is shown a complete pipe making plant which is intended to produce pipe of a given size, it being understood that this unit may constitute a single bay of a large plant which produces pipe of many different sizes. The bay, which is substantially rectangular in plan, provides a series of areas or zones arranged longitudinally thereof. The middle zone or area, which is the main or producing zone, is equipped for the flask ramming, assembling, casting and shake-out operations; while the remaining zones or areas are contributory to the main zone and are provided, respectively, for handling and reconditioning the sand and for separating the core bars from the pipe, reconditioning the core bars and returning them for re-use, and conducting the pipe away for the finishing operations.

According to the invention, the three primary elements which make up the molds, namely, the flasks consisting of copes and drags, the cores and the sand, are subjected to a cycle of operations which effects, (1) the assembling of said elements in a zone without interference with any of the other operations, while said operations are being performed independently at a maximum rate of speed; (2) the pouring of the metal and immediate removal of the copes and their conveyance to a convenient point for re-use; (3) the pulling of the pipes with the core bars from the drags; (4) the shaking out of the drags, their cooling and conveyance to a convenient point for re-use; and (5) the simultaneous reconditioning of the core bars and sand for re-use in later assembling operations. It will be clear that the various operations may be conducted independently, by workmen or gangs of workmen who specialize in the performance of a few simple tasks, and who work continuously without interference with and from the other workmen. The result is that the plant is put in full production, with all its equipment made use of to the fullest extent consistent with efficiency.

The main zone includes a station for ramming the copes and drags, a station for the making of the cores, a station for assembling the copes, drags and cores, and a casting and shake out station, and, as continuous production is desired, automatic ramming machines, placed in the ramming zone, are employed, the same being supplied with sand from service bins which are kept filled by a feeder belt, as indicated. The ramming machines will be of a known type, being known as jolt rammers, and require no description. Preferably, the ramming machines are at one end of the main zone, as shown, and preferably to one side of the bay and near the zone having the sand handling equipment, leaving a clear space, as shown, for the handling and transporting of copes and drags to and from the machines, without interference with any other work. A gang of workmen attends each ramming machine and rams either the copes or the drags on that one machine. The two machines operate continuously except for the time used for setting and removing the mold parts, but in overlapping cycles, being served by an overhead traveling bridge crane (crane No. 1) or other carrier. Crane No. 1, on one trip, conveys an empty cope to the cope ramming machine and brings back a rammed drag taking it to the assembling zone, and on the succeeding trip, said crane takes an empty drag to the drag ramming machine and returns with a rammed cope and so on, thus never making a move without accomplishing productive work.

As fast as a rammed drag has been placed in the assembling zone (station No. 1) its core is brought up by crane No. 2, and set in position on the drag. As disclosed in my Reissue Patent No. 17,121, the cores consist of core bars on which sand cores are formed, and which, when set, are supported rigidly so as to have a slight downward deflection in the middle, said deflection being counteracted by the inward flow of metal when the casting takes place. The Patent No. 1,779,477 of Ira Langston discloses a convenient instrument by which the amount of deflection of the cores may be measured at the time the cores are set. When the proper core setting has been accomplished, a rammed cope is brought up by crane No. 1 and is lowered over the drag having the core set, and the mold parts are secured together by the usual locking devices. As crane No. 1 goes back, it picks up an empty cope from a pile of copes adjacent the assembling zone, as shown, and carries it to the cope ramming machine, so that the latter is idle only for a brief period. Each time crane No. 1 brings up a rammed drag, cores must be placed promptly before said crane has had time to return with a rammed cope for that particular drag. Obviously, crane No. 1 cannot handle all the mold parts without considerable idle traveling; hence, to crane No. 2 is assigned the task of bringing the cores from the core making station to the assembling zone, and this is done by causing crane No. 2 to follow crane No. 1 down the bay each time crane No. 1 has brought up a rammed drag, to pick up a core or a plurality of cores from the core making station, and carry the core or cores to the drag awaiting it or them in the assembling zone.

As crane No. 1 brings up the drags and copes on alternate trips, it will be clear that crane No. 2 follows crane No. 1 down the bay only on alternate trips, and therefore has regular periods in which it is free to do other work. According to the preferred procedure, crane No. 2 in such periods acts as a mold carrier, to move the completed molds up the bay to the casting and shake-out zone (station No. 2). Obviously, any suitable conveyor operating near the floor of the plant may be employed for moving the completed molds up the bay to the casting zone. When crane No. 2 is used to pick up the complete flasks or molds, it will do so preferably by means of a rig such as is claimed in my Patent No. 1,765,023.

For utmost efficiency, the core making is done by machinery, and the machine is placed between the assembling zone and the nearest ramming machine, but to one side of the bay so as to leave room for handling of the cores and not interfere with the conveyance of the copes and drags to and from the ramming machines. The preferred form of core machine is described and claimed in my Patent No. 1,779,485, while the preferred core bar supports are claimed in my Patent No. 1,765,020. As shown in said patent, the core machine is so built as to permit the passage of the core bars therethrough, without retrogressive movement, which would cause loss of time. One side of the machine is therefore open to receive the bare core bars from the delivery point of the bay in which the core bars are handled, while the other side of the machine delivers the completed cores to a carrier (for example, the one described in my Patent No. 1,779,484), which may be picked up by crane No. 2 and conveyed to the assembling zone to effect setting of several core bars at one time, if desired.

It will now be clear that the sand handling and reconditioning zone and the core bar handling and reconditioning zone are contributory to the main zone. The apparatus in the contributory zones feeds or delivers reconditioned sand and cores into the main zone at the places most conducive to efficient work and high production.

Whenever there are enough molds in the casting zone to take the contents of a ladle of molten iron, the hot metal from the cupola is carried to a point where crane No. 3 may pick up the ladle (which may be of the type described in my Patent No. 1,535,676) and the metal is then poured. Depending on the diameter of pipe being cast, there will be one, two, four, six or more pipes formed in each mold during each casting operation. A typical plant for making six inch pipe will cast four of such pipes in each mold, each pipe being sixteen feet long. As soon as crane No. 3 has completed the pouring, it returns the ladle to the car (not shown) which runs on the hot metal track and obtains a new supply of metal from the cupola.

When the pouring is ended, crane No. 3 moves back over the nearest flask in which the metal was first poured, and upon release of the locking devices by an operator, lifts the cope off and moves it to one side to the shake out machine. The cope has not had time to get very hot, and hence undergoes no cooling other than radiation to the atmosphere. The shake out removes whatever sand clings to the cope, and a wall crane, or the equivalent, takes the cleaned out cope and carries it nearly the length of the bay back to a storage point somewhere near the ramming zone, preferably to one side as shown and in the path of crane No. 1. A pile of copes may be built at this point, to save floor space and to provide a small reserve of this element of the equipment, so that there need never be any delay. The wall crane will return for another cope as soon as one has been set down, and so on until all the copes from the poured molds have been removed, shaken out and stacked. Of course, crane No. 1 is not idle, but continues to travel between the stack of copes (and the adjacent stack of drags to be described) and the ramming machines, so that the stacks are being continually depleted about as fast as they are formed, and never occupy so much space in the bay as to interfere in any way with the movements of the laborers or apparatus in the bay.

By the time all the copes are off, the pipes in the drags are sufficiently hard to permit removal, which is done by crane No. 3, the pipes (with the cores therein) being placed on a transfer carriage, adjacent to the casting and shake-out zone, so disposed as to move the pipes out of the main bay with a minimum of handling and lost motion. From the transfer carriage, the pipes roll to a pipe run leading underneath a monorail hoist, which may carry the pipes (with the cores) down the bay to the point where the cores are removed, as will be described.

Obviously, when crane No. 3 is at the upper end of the main zone, the operator of crane No. 2 has an opportunity of bringing up a new mold. As the molten metal is obtained from the upper end of the bay and the shake-out is also located there, crane No. 3 will frequently be out of the way of crane No. 2, the operator of which will move back and forth, keeping cores supplied to the assembling zone and completed molds supplied to the casting zone as fast as equipment and space are provided for them.

As soon as the pipes have been drawn, the drags will be conveyed, one at a time, to the shake-out station. When cleaned of their sand, the drags will be carried by the wall crane to a cooling station, because the drags have been exposed to the heat of the molten iron much longer than the copes and hence have become quite hot. The cooling station is located along the path of the wall crane and may consist of a vat or tank containing water in which the flasks are dipped. The cooled drags are then carried to a nearby point adjacent to the stack of copes and piled alongside said stack, but preferably nearer the ramming machine, as shown. Crane No. 1 gets its supply of empty drags from the pile formed by the wall crane.

While the preferred method of operation is to use three bridge or traveling cranes and a wall crane, as described, it is obvious that fewer cranes may be used which, however, will certainly result in decreased production, other things being equal. For instance, crane No. 2 may be dispensed with by having crane No. 1 set the cores and crane No. 3 transfer the completed molds from the assembling zone to the casting zone. The wall crane may also be dispensed with by dividing the work between the remaining cranes.

When the pipes with the core bars in them are placed on the transverse runway beneath the monorail hoist, above referred to, they are picked up, preferably several at a time, and carried in an endwise position down the bay nearly the length of the same to a pipe storage run (Fig. 1ª) which may consist of two spaced rails elevated above the floor, and preferably inclined to cause the pipes to roll slowly along the bay without labor. The pipe storage run is preferably of sufficient capacity for the pipes and core bars to cool off considerably. It should be noted that the monorail takes the pipes from the pipe carriage near the casting zone and without turning them carries the pipes pointing in the direction in which they travel, to economize space and prevent possible accidents in the adjacent zones, and that it turns at the point where the pipes are deposited to swing the pipes around to the proper transverse position on the storage runway, without losing time or additional labor for the swinging operation.

Above the pipe storage run is a pipe transfer monorail, whose hoist is used for picking up the pipes with the core bars in them, pulling out the core bars (at the bar pulling station) and laying them on the core bar run, which is adjacent the pipe storage run, and carrying the pipes to and laying them on one of the pipe runs leading to the pipe rattlers, which clean the pipes. Instead of a hoist, a core bar stripper may be used, as described and claimed in my Patent No. 1,765,022. Because of the length of time it takes to clean pipes, a number of rattlers may be needed, in order not to slow up production. The core sand, which falls out of the pipes at the bar pulling station may be collected by a return sand belt (not shown) or other conveyor, leading to core sand reconditioning apparatus (not shown) which may continually supply the core machine with sand.

The core bars may either be rolled on their run manually, or may roll by gravity back toward the core making machine. During their passage over the run, the core bars further cool, and may be handled by the time they reach the core machine. Before the core bars are placed on the run leading to the core machine by the monorail which travels over the core bar run, the core bars are brought to a testing and straightening machine, which, first rotates a core bar, permitting the operator to note any bends in it, and then straightens it, for instance, as disclosed in the patent of William P. Woods, No. 1,659,181. The monorail may also travel over a core bar storage run extending between the pipe carriage and the core machine, and insuring a constant supply of core bars in good condition, should the travel of the core bars be delayed unduly by the testing and straightening process. It will be understood that the core bars do not usually need straightening, but should always be tested to insure the manufacture of pipe having uniform walls, and that if tests show that a number of successive core bars need straightening, passage of the untested core bars may be delayed for several minutes, which should be avoided, as any delay would hold back the entire production. The provision, as shown, of a reserve supply of core bars on a run leading to the core machine but out of the way of the usual path of the core bars is therefore highly advantageous, though not absolutely necessary.

The sand handling and reconditioning zone is located alongside the main zone and includes, on the supply side, one or more storage bins, a conditioner or aerator, and a conveyor leading from the conditioner to the ramming machines. Excess sand dumped during the ramming operation is returned to the storage bins by a clean-up belt, which may deliver the excess sand to the blender, as shown. The mold sand shaken-out at the shake out station is carried down the bay by a return sand belt, a magnetic pulley being employed to separate the particles of iron, and a screen for breaking up or separating any hard lumps. From the screen, the cleaned sand is carried to a pug mill, thence to the blender and finally to the storage bins.

From the foregoing description, it will be clear that the sand, the core bars and the copes and drags each travel progressively in closed, continuous paths, without retrogression, and each in its own path except where the paths merge to a common path in the assembling and casting bay. The fact that there is no retrogression is most important, because any retrogressive movement entails retracing the same or an equivalent path, resulting in a loss of time and labor, the expenditure of unnecessary power, and delay in progress of the work. The fact that each element moves in its own path prevents conflicting movements which would delay one or more phases of the operation. Furthermore, it will be observed that each element traverses a path of minimum length. The metal travels from the cupola no farther than is absolutely necessary; the core bars travel no farther than is necessary to get them out of the way of the following elements, and to recondition them and return them for the making and placing of new cores; the sand is carried with a minimum of equipment for a minimum distance and is reconditioned on its return; and the copes and drags are conveyed the shortest possible distance and along the straightest practicable paths consistent with a plant of sufficient size to handle the output of two ramming machines. All this is done without interference, confusion, or delay.

The described plant makes possible the continuous production for 24 hours a day of cast iron pipe cast horizontally, and results in an output far exceeding anything previously known or thought possible with like equipment, and hence in materially lowering the cost of production.

Obviously the invention is not limited to the illustrative embodiment of a plant herein shown and described, or to the production of cast iron pipe, as similar articles may be manufactured by the same method and with the same general arrangement of equipment.

What I claim is:—

1. A process of manufacturing cast iron pipe and the like by the horizontal method, characterized by the converging, at a point adjacent to a supply of molten metal, of the three necessary elements of finished pipe molds, namely, flasks, sand and cores; and the diverging of these three elements for reconditioning; each element moving in its own path up to approximately the point of assembling so as not to interfere at any time with the movement of other elements.

2. A process of manufacturing cast iron pipe and the like by the horizontal method, characterized by bringing together a plurality of finished pipe molds; pouring the molds; separating the component elements of the molds and conveying them in different non-conflicting paths; reconditioning the elements at points in their paths; reassembling them to produce other finished molds; and repeating the cycle of operations.

3. A process of manufacturing cast iron pipe and the like by the horizontal method characterized by pouring a plurality of finished pipe molds; separating the cast pipes containing the core bars from the flasks; shaking out the flasks; conveying the three elements, namely, the pipes with the core bars, the flasks and the sand in separate, closed, non-conflicting paths; reconditioning the component parts of the molds at points in their paths; said paths converging to a common assembling zone; said elements having a common path from the assembling zone to the pouring zone; and repeating the cycle of operations.

4. A method of manufacturing cast iron pipe and the like by the horizontal method, characterized by bringing together and assembling the elements which make up the molds; conveying the finished molds progressively to a pouring zone; pouring the molds; removing the castings; shaking down the molds; conveying the component elements of the molds in separate, non-conflicting paths which converge at the assembling zone; mechanically reconditioning said elements; and reassembling the elements to repeat the cycle of operations.

5. A method of handling poured cast iron pipe molds which comprises separating the component elements, namely the flasks, the sand and the cores; conveying said elements to separate points without conflicting with each other; reconditioning the elements at said points; bringing them together without conflict and reassembling them to produce finished new molds; transferring the new molds to a pouring zone; pouring said molds; and repeating the cycle of operations.

6. A plant for manufacturing cast iron pipe and the like by the horizontal method, comprising, in combination, three independently operated traversing carriers located in the flask ramming, assembling and casting zones, so as to move the elements which make up the molds and the completed molds substantially continuously and progressively in a path which leads to the casting zone; said zones being of such areas and arrangement, and the carriers being so disposed and operated that the work is divided between them, keeping all three of them busy substantially all the time, without interference and without retrogressive movement of the mold elements.

7. A plant for manufacturing cast iron pipe and the like by the horizontal method, characterized by a synchronization and coordination of movement of and division of work between two independently operated traversing carriers located and operating in the flask ramming, assembling and casting zones, so as to move the elements which make up the molds and the completed molds substantially continuously and progressively in a path which leads to the casting zone; one of said carriers handling the copes and drags between the ramming zone and the assembling zone; the other carrier conveying the flasks from the assembling zone to the casting zone and assisting in the casting of the metal and conveying the pipes and core bars away from the flasks and also conveying the flasks to the shake-out stations; either carrier conveying the cores to the assembling station.

8. A plant for manufacturing cast iron pipe and the like by the horizontal method, characterized by a synchronization and coordination of movement of and division of work between three independently operated traversing carriers located and operating in the flask ramming, assembling and casting zones, so as to move the elements which make up the molds and the completed molds substantially continuously and progressively in a path which leads to the casting zone; one of said carriers handling the copes and drags between the ramming zone and the assembling zone; a second carrier conveying the cores to the assembling zone and the completed flasks to the casting zone; and a third carrier casting the metal and conveying the flasks to the shake-out station.

9. A plant for manufacturing cast iron pipe and the like by the horizontal method, characterized by the synchronization and coordination of movement of and division of work between four independently operated traversing carriers located and operating in the flask ramming, assembling and casting zones, so as to move the elements which make up the molds and the completed molds substantially continuously and progressively in a path which leads to the casting zone, one of said carriers handling the copes and drags between the ramming zone and the assembling zone; a second carrier conveying the cores to the assembling zone and the completed flasks to the casting zone; a third carrier casting the metal and conveying the flasks to the shake-out station; and a fourth carrier transporting the copes and drags from the shake-out station to the assembling zone.

10. A plant for manufacturing cast iron pipe and the like horizontally, comprising apparatus for handling core bars in a continuous closed path, with the core bars moving progressively and not retrogressively along said path; and apparatus for handling copes and drags between the ramming and shake-out zones with the copes and drags moving each in continuous closed paths and progressively but not retrogressively along said paths.

11. A plant for manufacturing cast iron pipe and the like horizontally, comprising apparatus for transporting the sand between the shake-out point and the ramming zone; apparatus for handling core bars in a continuous closed path, with the core bars moving progressively and not retrogressively along said path; and apparatus for handling copes and drags between the ramming and shake-out zones with the copes and drags moving each in continuous closed paths and progressively but not retrogressively along said paths.

12. A plant for manufacturing cast iron pipe and the like horizontally, comprising, in combination, a crane runway; three cranes in said runway; one crane for conveying flasks to a ramming zone and from the ramming zone to an assembling zone, another crane for conveying cores to the flasks in the assembling zone and subsequently conveying the completed flasks from the assembling zone to the casting and shake-out zone; the last crane for conveying hot metal to the flasks and for shaking out the flasks.

13. A plant for manufacturing cast iron pipe and the like horizontally, comprising, in combination, a crane runway; three cranes in said runway; one crane for conveying flasks to a ramming zone and from the ramming zone to an assembling zone, another crane for conveying cores to the flasks in the assembling zone and subsequently conveying the completed flasks from the assembling zone to the casting and shake-out zone; the last crane for conveying hot metal to the flasks and for shaking out the flasks; the two last-mentioned cranes having auxiliary hoists adapted to lift both ends of a load simultaneously.

14. A plant for the manufacture of cast iron pipe and the like horizontally, comprising, in combination, a bay having an assembling zone, a sand handling zone on one side of the assembling zone, and a pipe and core bar handling zone on the other side of the assembling zone; conveying means in the assembling zone for the core bars and flasks; a source of molten metal at the upper end of the assembling zone; a ramming machine at the lower end of the assembling zone; a core making machine so placed and constructed as to be open on one side to the pipe and core bar handling zone and on the other side to the assembling zone so as to take core bars from the former and deliver finished cores into the latter; and means for conveying the core bars, after casting, by a route which does not conflict with the movement of other parts to the core machine.

15. A plant for the manufacture of cast iron pipe and the like horizontally comprising, in combination, a bay having an assembling zone; a sand handling zone on one side of the assembling zone; and a pipe and core bar handling zone on the other side of the assembling zone; conveying means in the assembling zone for the core bars and flasks; a ramming machine at one end of the assembling zone; a core making machine placed in the assembling zone adjacent the pipe and core bar handling zone and open to both zones so as to take core bars from the latter and deliver finished cores into the former; said core making machine being near the ramming machine and between said machine and the assembling zone; and means for conveying the core bars, after casting, by a route which does not conflict with the movement of other parts, to the core machine.

16. A plant for the manufacture of cast iron pipe and the like horizontally, comprising, in combination, a bay having an assembling zone; a sand handling zone on one side of the assembling zone, and a pipe and core bar handling zone on the other side of the assembling zone; conveying means in the assembling zone for the core bars and flasks; a source of molten metal at the upper end of the assembling zone; a ramming machine at the lower end of the assembling zone; a core making machine placed in the assembling zone adjacent the pipe and core bar handling zone and open to both zones so as to take core bars from the latter and deliver finished cores into the former; conveying means in the pipe and core bar handling zone for transporting the pipe with the core bars away from the casting zone; means in the same zone for effecting separation of the pipe and core bars; means in said zone for the return of the core bars to the core machine without interference with said pipe transporting means; and means facilitating the conveyance of the pipe away from the aforesaid point of separation for the finishing steps.

17. A plant for the manufacture of cast iron pipe and the like horizontally, comprising, in combination, a bay having an assembling zone, a sand handling zone on one side of the assembling zone, and a pipe and core bar handling zone on the other side of the assembling zone; two traveling cranes in the assembling zone for handling the flasks and the cores; a source of molten metal at the upper end of the assembling zone; a ramming machine at the lower end of the assembling zone; a core making machine placed in the assembling zone adjacent the pipe and core bar handling zone and open to both zones so as to take core bars from the latter and deliver finished cores into the former; means for shaking out the flasks; another crane in the assembling zone for casting and shaking out; and means for conveying the core bars, after casting, by a circuitous route to the core machine.

18. A plant for manufacturing cast iron pipe and the like horizontally, comprising, in combination, a building providing three zones or areas; the first, main zone or area being equipped with means for conveying flasks, means for conveying core bars, means for conveying molten metal, means for ramming flasks, means for making or assembling cores, means for shaking out flasks, means for conveying pipes containing core bars, and a source of molten metal within reach of the metal conveying means; a second zone or area being equipped with sand conditioning and sand handling machinery, and means for conveying sand from the first to the second zone; and a third zone or area equipped with means for conveying pipe and core bars, means for separating pipe from the core bars, means for straightening core bars, and means for returning core bars to the core machine.

19. A plant of the character described comprising, in combination, a pair of ramming machines placed end to end; a crane for serving the two ramming machines; a core-making machine delivering cores into the area over which said crane operates; a crane for carrying the cores from said machine to the mold assembling station and also for carrying the completed molds to the casting station; and a third crane for conducting the hot metal over the completed molds and casting the same, and for shaking out the flasks after casting.

20. A plant of the character described comprising, in combination, a pair of ramming machines placed end to end; a crane for serving the two ramming machines; a core-making machine delivering cores into the area over which said crane operates; a crane for carrying the cores from said machine to the mold assembling station and also for carrying the completed molds to the casting station; a third crane for conducting the hot metal over the completed molds and casting the same, and for shaking out the flasks after casting; a sand supply bin; a sand conveyor returning sand from the point where the flasks are shaken out to the supply bin; means in the path of said sand conveyor for reconditioning the sand; and a conveyor leading from the supply bin to the service bins of both ramming machines; the return sand conveyor running substantially parallel to the direction in which the molds move, but located in a different area and moving in the opposite direction.

21. A plant of the character described comprising, in combination, a pair of ramming machines placed end to end; a crane for serving the two ramming machines; a core making machine delivering cores into the area over which said crane operates; a crane for carrying the cores from said machine to the mold assembling station and also for carrying the completed molds to the casting station; a third crane for conducting the hot metal over the completed molds and casting the same, and for shaking out the flasks after casting; a pipe carriage for drawing the pipes with the core bars therein; a conveyor for carrying the pipes with the core bars to a bar pulling station; mechanism for pulling the core bars; a guiding support for the core bars to roll over on their return to the core machine; and means in the path of the core bars for reconditioning them.

22. A plant of the character described comprising, in combination, a pair of ramming machines placed end to end; a crane for serving the two ramming machines; a core making machine delivering cores into the area over which said crane operates; a crane for carrying the cores from said machine to the mold assembling station and also for carrying the completed molds to the casting station; a third crane for conducting the hot metal over the completed molds and casting the same, and for shaking out the flasks after casting; a pipe carriage for drawing the pipes with the core bars therein; a conveyor for carrying the pipes with the core bars to a bar pulling station; mechanism for pulling the core bars; a guiding support for the core bars to roll over on their return to the core machine; means in the path of the core bars for reconditioning them; a sand supply bin; a sand conveyor returning sand from the point where the flasks are shaken out to the supply bin; means in the path of said sand conveyor for reconditioning the sand; and a conveyor leading from the supply bin to the service bins of both ramming machines; the return sand conveyor running substantially parallel to the direction in which the molds move, but located in a different area and moving in the opposite direction.

23. A plant of the character described comprising, in combination, a core making machine open through the middle to permit core bars to enter laterally from one side, and after formation of the cores, to emerge from the other side; a run for the core bars leading to the entrance side of the core machine;

and a conveyor operating toward and from the machine in the assembling zone and to conduct the cores to the flasks.

24. A plant of the character described comprising, in combination, a core making machine open through the middle to permit core bars to enter laterally from one side, and after formation of the cores, to emerge from the other side; a run for the core bars leading to the entrance side of the core machine; a run for storage of the core bars extending in the line of the first named run but disposed beyond the opposite end of the core machine and leading thereto; and a lateral run for feeding core bars from the longitudinal run on either side into the machine.

25. A plant of the character described comprising, in combination, a core making machine open through the middle to permit core bars to enter laterally from one side, and after formation of the cores, to emerge from the other side; a run for the core bars leading to the entrance side of the core machine; a run for storage of the core bars extending in the line of the first named run but disposed beyond the opposite end of the core machine and leading thereto; a lateral run for feeding core bars from the longitudinal run on either side into the machine; a conveyor for serving the core machine and operating over all three of said runs; and a conveyor in the assembling zone and operating toward and from the machine to conduct the cores to the flasks.

26. A plant for manufacturing cast iron pipe and the like, horizontally comprising, in combination, a crane runway; two cranes in said runway; one crane for conveying flasks to the ramming zone, and from the ramming zone to the assembling zone and for setting cores; a second crane for conveying the completed flasks from the assembling zone to the casting and shake-out zone and for conveying hot metal to the flasks and shaking out the flasks; the last mentioned crane having an auxiliary hoist adapted to lift both ends of a load simultaneously.

27. A plant of the character described, comprising, in combination, a pair of ramming machines placed end to end; a crane for serving the two ramming machines and for setting cores; a core making machine delivering cores into the area over which said crane operates; a second crane for conveying the completed molds to the casting station, and for conducting the hot metal over the completed molds and casting same, and for shaking out the flasks after casting; a pipe carriage for drawing the pipe with the core bars therein; a conveyor for carrying the pipe with the core bars to a bar pulling station; mechanism for pulling the core bars; a guiding support for the core bars to roll on and return to the core machine; means in the path of the core bars for reconditioning them, a sand supply bin; a sand conveyor returning sand from the point where the flasks are shaken out to the supply bin; means in the path of said sand conveyor for reconditioning the sand; and a conveyor returning from the supply bins to service bins of both ramming machines, the return sand conveyor running substantially parallel in the direction in which the molds move, but located in a different area and moving in the opposite direction.

28. A plant of the character described comprising, in combination, a ramming machine; a supply of molten metal located a considerable distance from the ramming machine; a carrier for feeding empty copes and drags to, and conveying rammed copes and drags away from, said ramming machine; a machine for forming cores on core bars, located near the ramming machine but with a space between for free passage of the copes and drags and the core; the plant having an area sufficient for the reception of a multiplicity of flask sections, and which is so located that the core forming machine is between said area and the ramming machine; a carrier for moving the complete flasks toward the supply of molten metal; the plant also having an area for containing a plurality of complete flasks for the pouring operation; means for conveying metal from said supply for pouring into the flasks; a shake-out machine near the area where the pouring takes place; pipe-and-core-bar withdrawing means also near said area, but on the other side; means for separating the core bars from the pipe; means for conveying the core bars and pipe to said separating means; means for conveying the core bars to the core making machine; means for conveying sand away from the shake-out machine; means for re-conditioning the sand; means for conveying the re-conditioned sand to the ramming machine; and means for conveying the copes and drags, after being shaken out, to points near the carrier which feeds them to the ramming machine.

29. A plant of the character described comprising, in combination, a pair of ramming machines located near each other; a supply of molten metal located a considerable distance from the ramming machine; a crane for feeding empty copes to one of the ramming machines and empty drags to the other ramming machine, and for conveying rammed copes and drags to an assembling zone; a second crane; a core making machine located near the assembling zone and so arranged as to deliver the cores within reach of the second crane; the plant having a sufficient area in the assembling zone and between said zone and the supply of metal to permit continual assembling of flask members and continual moving of the complete flasks toward the supply of metal; said second crane traveling over said area and handling the complete flasks as well as the cores; a third crane for conveying the molten metal in ladles to the flasks for pouring; a shake-out near the pouring zone so that the third crane may conduct the copes and drags to it; a conveyor for moving the empty copes and drags back, without interference with forward movement of the flask parts, to points near the ramming machines, where the first crane may reach them; means for drawing the pipes with the core bars off the drags, after casting; means for separating the core bars from the pipes; means for conveying the core bars back to the core machine; means for reconditioning the sand dropped in the shake-out; and means for returning the reconditioned sand to the ramming machines.

30. A plant of the character described comprising, in combination, a pair of ramming machines located near each other; a supply of molten metal located a considerable distance from the ramming machine; a crane for feeding empty copes to one of the ramming machines and empty drags to the other ramming machine, and for conveying rammed copes and drags to an assembling zone; a second crane; a core making machine located near the assembling zone and so arranged as to deliver the cores within reach of the second crane; the plant having a sufficient area in the assembling zone and between said zone and the supply of metal to permit continual assembling of flask members and continual moving of the complete flasks toward the supply of metal; said second crane traveling over said area and handling the complete flasks as well as the cores; a third crane for conveying the molten metal in ladles to the flasks for pouring; a shake-out near the pouring zone so that the third crane may conduct the copes and drags to it; a conveyor for moving the empty copes and drags back, without interference with forward movement of the flask parts, to points where the first crane may reach them; means for cooling the drags on their way back to the ramming machine; means for drawing the pipes with the core bars off the drags, after casting; means for separating the core bars from the pipes; means for conveying the core bars back to the core machines; means for straightening such core bars as are warped by the heat, on their return trip to the core machine; means for reconditioning the sand dropped in the shake-out; and means for returning the reconditioned sand to the ramming machines.

31. A plant of the character described comprising, in combination, a ramming machine; a core making machine; a supply of molten metal located a considerable distance from the ramming machine with an aisle or area therebetween for the assembly and conveyance of the flask elements and for the pouring of the metal; conveyors for the flask elements and for the metal; the parts being so arranged that the drags and copes are first rammed and then moved straight up the aisle for assembling, and the core bars follow the drags and precede the copes; one of the conveyors being so constructed and arranged as to move the completed flasks straight up the aisle to a position near the supply of metal, for casting; a shake-out machine to one side of the casting zone; a pipe-and-core-bar withdrawing mechanism on the other side of the casting zone; a conveyor for the copes and drags leading from the shake-out back to a point near the ramming machine, said conveyor moving the copes and drags back in a substantially straight line path parallel to the path of the flask elements up the main aisle; the two paths aforesaid being alongside each other but non-interfering so that free movement each way is had, with a minimum distance traversed; the plant having an aisle or area on the same side as the pipe-and-core-bar withdrawing mechanism and being adjacent to the main aisle; a conveyor working in the aisle last-mentioned and conducting the pipes and core bars in substantially straight paths, in a direction opposite to that in which the flask elements move; means located near the end of the last-mentioned aisle for separating the core bars from the plates; the last-mentioned aisle having provision for the return movement of the core bars, up to core making machine, in a direction opposite to that in which the pipes and core bars together move, the return movement taking place without interference with the previous movement, and in a path parallel to the paths of the flask elements in the main aisle; the core bars thus being moved a minimum distance in view of the exigencies of the process of manufacture.

32. A plant of the character described comprising, in combination a ramming machine; a core making machine; a supply of molten metal located a considerable distance from the ramming machine with an aisle or area therebetween for the assembly and conveyance of the flask elements and for the pouring of the metal; conveyors for the flask elements and for the metal; the parts being so arranged that the drags and copes are first rammed and then moved straight up the aisle for assembling, and the core bars follow the drags and precede the copes; one of the conveyors being so constructed and arranged as to move the completed flasks straight up the aisle to a position near the supply of metal, for casting; a shake-out machine to one side of the casting zone; a pipe-and-core-bar withdrawing mechanism on the other side of the casting zone; a conveyor for the copes and drags leading from the shake-out back to a point near the ramming machine, said conveyor moving the copes and drags back in a substantially straight line path parallel to the path of the flask elements up the main aisle; the two paths aforesaid being alongside each other but non-interfering so that free movement each way is had, with a minimum distance traversed; sand conveying means leading from the shake-out to the ramming machine; sand re-conditioning apparatus interposed in the return path of the sand; said sand conveyor and reconditioning apparatus being located alongside of the main aisle on the same side as the shake-out, and spaced only a short distance from the main aisle so as to transport the sand a minimum distance from the minimum equipment; the plant having an aisle or area on the same side as the pipe-and-core-bar withdrawing mechanism and being adjacent to the main aisle, a conveyor working in the aisle last-mentioned and conducting the pipes and core bars in substantially straight paths, in a direction opposite to that in which the flask elements move; means located near the end of the last-mentioned aisle for separating the core bars from the pipes; the last-mentioned aisle having provision for the return movement of the core bars, up to core making machine, in a direction opposite to that in which the pipes and core bars together move, the return movement taking place without interference with the previous movement, and in a path parallel to the paths of the flask elements in the main aisle; the core bars thus being moved a minimum distance in view of the exigencies of the process of manufacture.

33. That process of continuously making cast iron pipe and the like by the horizontal method which consists in ramming the flask sections in a certain zone or area of the plant; simultaneously forming the cores; conveying the rammed flask sections to another zone or area and there assembling them with the cores; conveying the complete flasks to a zone or area relatively near to the supply of molten iron; pouring the metal; immediately thereafter removing the copes so that the copes do not become excessively hot and hence may be rammed again shortly without artificial cooling; removing the pipes with the cores therein as soon as the temperature thereof has fallen to a point permitting such removal without injury to the pipes; and promptly conveying the copes, drags, core bars and pipes away for further processes, thus making room in the casting zone for additional flasks.

34. That process of continuously making cast iron pipe and the like by the horizontal method which consists in ramming the flask sections in a certain zone or area of the plant; forming the cores; conveying the rammed flask sections to another zone or area and there assembling them with the cores; conveying the complete flasks to a zone or area relatively near to the supply of molten iron; pouring the metal; immediately thereafter removing the copes so that the copes do not become excessively hot; removing the pipes with the cores therein as soon as the temperature thereof has fallen to a point permitting such removal without injury; conveying the copes after removal to a shank-out device to rid them of their sand; then conveying the empty copes back to the ramming zone; conveying the drags, after removal of the pipes and cores, to a shake-out device; cooling the drags after shaking out, and conveying them to the ramming zone.

35. That process of continuously making cast iron pipe and the like by the horizontal method which consists in ramming the flask sections in a certain zone or area of the plant; forming the cores; conveying the rammed flask sections to another zone or area and there assembling them with the cores; conveying the complete flasks to a zone or area relatively near to the supply of molten iron; pouring the metal; immediately thereafter removing the copes so that the copes do not become excessively hot; removing the pipes with the cores therein as soon as the temperature thereof has fallen to a point permitting such removal without injury; conveying the copes after removal to a shake-out device to rid them of their sand; then conveying the empty copes back to the ramming zone; conveying the drags, after removal of the pipes and cores, to a shake-out device; cooling the drags after shaking out, and conveying them to the ramming zone; conveying the pipes with the core bars therein away from the pouring zone, simultaneously with the conveyance of the copes and drags; separating the core bars from the pipes; returning the core bars to the assembling zone for re-use; collecting the sand from the shake-out; reconditioning said sand; and returning the same to the ramming zone for re-use.

In testimony, that I claim the foregoing as my own, I have hereto affixed my signature.

JAMES R. McWANE.